United States Patent
Baumann et al.

(10) Patent No.: US 7,544,411 B2
(45) Date of Patent: *Jun. 9, 2009

(54) SELF-CLEANING PAINT COATING AND A METHOD AND AGENT FOR PRODUCING THE SAME

(75) Inventors: Martin Baumann, Bad Vilbel (DE); Klaus-Dieter Fritsche, Colditz (DE); Dagmar Korbelarz, Hanau (DE); Stephan Ludwig, Neuberg (DE); Lutz Poth, Rossdorf (DE)

(73) Assignee: Ferro GmbH, Frankfurt (DE)

( * ) Notice: Subject to any disclaimer, the term of this patent is extended or adjusted under 35 U.S.C. 154(b) by 704 days.

This patent is subject to a terminal disclaimer.

(21) Appl. No.: 10/467,261

(22) PCT Filed: Dec. 21, 2001

(86) PCT No.: PCT/EP01/15242

§ 371 (c)(1), (2), (4) Date: Dec. 12, 2003

(87) PCT Pub. No.: WO02/064266

PCT Pub. Date: Aug. 22, 2002

(65) Prior Publication Data

US 2004/0081818 A1    Apr. 29, 2004

(30) Foreign Application Priority Data

Feb. 10, 2001   (DE) .................. 101 06 213

(51) Int. Cl.
*B32B 5/16*   (2006.01)
*B05D 5/00*   (2006.01)

(52) U.S. Cl. ............... 428/323; 428/328; 428/331; 428/409; 427/372.2; 427/385.5; 427/386; 427/402; 427/407.1

(58) Field of Classification Search .............. None
See application file for complete search history.

(56) References Cited

U.S. PATENT DOCUMENTS

| | | |
|---|---|---|
| 3,931,428 A | 1/1976 | Reick |
| 3,951,633 A | 4/1976 | Danihel |
| 3,958,073 A | 5/1976 | Trevisan et al. |
| 3,998,643 A | 12/1976 | Liddle |
| 4,377,608 A | 3/1983 | Daudt et al. |
| 4,387,195 A | 6/1983 | Tully et al. |
| 4,410,563 A | 10/1983 | Richter et al. |
| 4,482,656 A | 11/1984 | Nguyen et al. |
| 4,687,707 A | 8/1987 | Matsuo et al. |
| 5,141,915 A * | 8/1992 | Roenigk et al. ............. 503/227 |
| 5,240,774 A | 8/1993 | Ogawa et al. |
| 5,324,566 A | 6/1994 | Ogawa et al. |
| 5,424,130 A | 6/1995 | Nakanishi et al. |
| 5,437,894 A | 8/1995 | Ogawa et al. |
| 5,466,486 A | 11/1995 | Ogawa et al. |
| 5,478,651 A | 12/1995 | Tannenbaum |
| 5,599,489 A | 2/1997 | Saiki et al. |
| 5,644,014 A | 7/1997 | Schmidt et al. |
| 5,674,625 A | 10/1997 | Takahashi et al. |
| 5,800,918 A | 9/1998 | Chartier et al. |
| 6,048,910 A | 4/2000 | Furuya et al. |
| 6,068,911 A | 5/2000 | Shouji et al. |
| 6,156,409 A | 12/2000 | Doushita et al. |
| 6,235,383 B1 | 5/2001 | Hong et al. |
| 6,291,070 B1 | 9/2001 | Arpac et al. |
| 6,403,213 B1 | 6/2002 | Husmann |
| 6,447,919 B1 | 9/2002 | Brown et al. |
| 6,461,670 B2 | 10/2002 | Akamatsu et al. |
| 6,471,761 B2 | 10/2002 | Fan et al. |
| 6,485,838 B1 | 11/2002 | Shimada et al. |
| 6,511,753 B1 | 1/2003 | Teranishi et al. |
| 6,649,266 B1 * | 11/2003 | Gross et al. ................. 428/410 |
| 6,660,363 B1 | 12/2003 | Barthlott |
| 6,800,354 B2 * | 10/2004 | Baumann et al. ............ 428/141 |
| 2002/0150725 A1 | 10/2002 | Nun et al. |
| 2002/0164443 A1 | 11/2002 | Oles et al. |

FOREIGN PATENT DOCUMENTS

| | | |
|---|---|---|
| DE | 10018223 A1 | 4/2001 |
| DE | 19941753.9 | 5/2001 |
| DE | 19945513.9 | 5/2001 |
| DE | 19946280.1 | 5/2001 |
| DE | 10059487 A1 | 6/2002 |
| EP | 0684075 A1 | 11/1995 |

(Continued)

OTHER PUBLICATIONS

BASF Opposition filed Jul. 22, 2008, 11 pages.
English Translation of BASF Opposition filed Jul. 22, 2008, ten pages.
Ullmann's Encyclopedia of Industrial Chemistry, Fifth, Completely Revised Edition, vol. A23: Refractory Ceramics to Silicon Carbide, pp. 635-637.

*Primary Examiner*—Monique R Jackson
(74) *Attorney, Agent, or Firm*—Rankin, Hill & Clark LLP

(57) ABSTRACT

A self-cleaning paint coating that exhibits the LOTUS EFFECT and an agent and a method for producing the same. The paint coating comprises a paint base coat and a topcoat. The topcoat includes structure-forming particles and is at least partially hydrophobic. The structure-forming particles have an average particle diameter of less than 100 nanometers (nm) and form elevations in the topcoat surface that are interspaced at a distance of less than 50 nm. The topcoat of the paint coating is formed from the agent. The agent contains a liquid medium, a hydrophobating agent dissolved in the liquid medium, and structure-forming particles suspended in the medium. The method of forming the paint coating comprises coating a substrate with the base coat, applying the topcoat agent to the partially cured or uncured base coat, and curing of the top coat, and if required, the base coat.

16 Claims, No Drawings

FOREIGN PATENT DOCUMENTS

| | | |
|---|---|---|
| EP | 0748775 A2 | 12/1996 |
| EP | 0909747 A1 | 4/1999 |
| EP | 1075867 A1 | 2/2001 |
| EP | 0933388 B1 | 10/2002 |
| WO | PCT/EP95/02934 | 2/1996 |
| WO | PCT/DE00/02989 | 3/2001 |
| WO | PCT/EP00/12119 | 6/2001 |
| WO | PCT/EP01/02790 | 10/2001 |
| WO | PCT/EP01/14168 | 6/2002 |
| WO | PCT/EP01/15242 | 8/2002 |
| WO | PCT/EP02/06754 | 2/2003 |

* cited by examiner

SELF-CLEANING PAINT COATING AND A METHOD AND AGENT FOR PRODUCING THE SAME

CROSS REFERENCE TO RELATED APPLICATIONS

This Application is a National Stage application of PCT Application No. WO 02/064,266, filed Aug. 22, 2002, which claims priority to German Application No. DE 101 06 213.3, filed Feb. 10, 2001, the disclosures of which are hereby incorporated by reference in their entirety.

DESCRIPTION

The invention relates to self-cleaning lacquer coatings on any desired substrates; the lacquer coatings display the Lotus Effect®. The invention also provides processes and compositions for the production of the self-cleaning lacquer coatings.

It is known that to achieve a good self-cleaning effect of a surface this must also have, in addition to a good hydrophobicity, a microrough surface structure. The two features are realized in nature, for example in the lotus leaf; the surface formed from a hydrophobic material has pyramid-shaped elevations a few μm from one another. Water drops substantially come into contact only with these peaks, so that the contact area is tiny, which results in a very low adhesion. These relationships and the main usability of the "lotus effect" on industrial surfaces are the doctrine of A. A. Abramzon, Khimia i Zhizu (1982), no. 11, 38-40.

Without reference to the lotus effect, U.S. Pat. No. 3,354, 022 discloses water-repellent surfaces, wherein the surface has a microrough structure with elevations and depressions and is formed from a hydrophobic material, in particular a fluorine-containing polymer. According to one embodiment, a surface with a self-cleaning effect can be applied to ceramic tiles or to glass by coating the substrate with a suspension which contains glass beads having a diameter in the range from 3 to 12 μm and a fluorocarbon wax based on a fluoroalkyl ethoxymethacrylate polymer. Disadvantages of such coatings are their lower resistance to abrasion and moderate self-cleaning effect.

The doctrine of EP Laid-Open Specification 0 909 747 A1 is a process for producing a self-cleaning property on surfaces, in particular roof tiles. The surface has hydrophobic elevations with a height of 5 to 200 μm. Such a surface is produced by application of a dispersion of powder particles of an inert material in a siloxane solution and subsequent curing. As in the process acknowledged above, the structure-forming particles are not fixed to the surface of the substrate in an abrasion-stable manner.

The doctrine of EP Patent 0 772 514 is self-cleaning surfaces on objects with a synthetic surface structure of elevations and depressions, the distance between the elevations being in the range from 5 to 200 μm and the height of the elevations being in the range from 5 to 100 μm, and the structure comprising hydrophobic polymers or materials which have been rendered hydrophobic in a durable manner. Etching and embossing processes are suitable for formation of the structures, as well as coating processes, such as gluing-on of a hydrophobic polymer. If necessary, the structure formation is followed by a hydrophobization, for example a so-called silanization. The self-cleaning surfaces, that is to say surfaces which are to be cleaned by gently agitated water, such as coatings of vehicles, should not be exposed to severe mechanical, since the self-cleaning ability is thereby lost.

Similarly structured surfaces with hydrophobic properties are the doctrine of EP 0 933 388 A2. The surface has elevations with an average height of 50 nm to 10 μm and an average distance of between 50 nm to 10 μm, and a surface energy of the non-structured material of 10 to 20 mN/m. To achieve a particularly low surface energy and therefore hydrophobic and oleophobic properties, the structured surface contains fluorine-containing polymers, or has been treated using alkylfluorosilanes. Indications of also using coating processes for structuring the surface instead of the shaping processes disclosed here cannot be found in this document.

The doctrine of DE Application 100 63 739.6 is substrates, such as glass, ceramic, plastic, metals and glazed or enamelled substrates, with a self-cleaning surface. The self-cleaning surface comprises structure-forming particles with an average diameter of less than 100 nm, in particular less than 50 nm and at least 5 nm, and a layer-forming material, this being an inorganic or organic material. The structure-forming particles are fixed to the substrate by means of the layer-forming material. A portion of the primary particles and/or agglomerates thereof projects per se, or with a covering of the layer-forming material, at least partly from the surface and in this manner form elevations and depressions in the nanoscale range. The structured surface has a hydrophobic coating at least in part. To produce such self-cleaning surfaces, a composition which comprises structure-forming particles and an inorganic or organic layer-forming material is applied to the substrate by means of known coating processes, for example those of lacquering. After a cohesive and firmly adhering layer has been formed by a heat treatment, a hydrophobization follows, for example using fluorine-containing silanes and/or fluorine-containing siloxanes. Although the process which is the doctrine in this document can also be applied to substrates other than those mentioned therein, self-cleaning lacquer coatings which comprise a base lacquer layer and a top layer with an artificial surface structure are not mentioned. This document also contains no suggestion according to which the composition to be used for the production of a self-cleaning surface simultaneously comprises, apart from the structure-forming particles and an inorganic or organic binder, a hydrophobizing agent. In the process which is the doctrine of this document, the formation of the surface structure and the hydrophobization are carried out in separate steps.

The object of the present invention is accordingly to provide further substrates with a self-cleaning surface. Another object is directed at providing a composition with which the formation of a structured surface and the hydrophobization can be carried out simultaneously.

The objects mentioned and further objects such as are seen from the following description of the invention are achieved by the self-cleaning lacquer coatings according to the invention, the compositions for the production thereof and the process.

A self-cleaning lacquer coating comprising a base lacquer layer and a top layer with an artificial surface structure, formed from particles, of elevations and depressions has been found, and is characterized in that the particles have an average particle diameter of less than 100 nm and are at least partly bonded by means of a binder system in the top layer, the average height of and the average distance between the elevations are less than 50 nm and the surface or top layer is at least partly hydrophobic.

The self-cleaning lacquer coating according to the invention has a nanoscale surface structure with a hydrophobic character. Since the structure-forming primary particles, which have an average diameter of <100 nm, in particular <50 nm to about 5 nm, can also form agglomerates to a certain extent, the surface structure can also have a super-structure with larger distances and heights, in addition to the above-mentioned elevations and depressions. The average heights of and distances between the elevations of the super-structure are in general still significantly below 1 μm.

The structured top layer can have been hydrophobized by a separately applied hydrophobizing layer, which must be only a few atom layers thick, but according to a preferred embodiment of the invention the hydrophobizing agent is a constituent of the structure-forming particles, and a top layer comprising a cured binder system.

The self-cleaning lacquer coatings according to the invention have an exceptionally good self-cleaning effect, which is also reflected in a very low roll-off angle of <3° C., and preferably <1° C. Since the doctrine of EP Patent 0 772 514 is that the distance between the elevations of a self-cleaning surface structure should be in the range from 5 to 200 μm and in EP Patent Application 0 933 388 an average height of and an average distance between the elevations of a structured surface are stated as 50 nm to 10 μm, it was not foreseeable that a lacquer coating with a top layer with a considerably finer surface structure and a hydrophobic character has very good self-cleaning properties. On the basis of the average diameter of the structure-forming particles and the surface structure according to the invention effected as a result, the lacquer coatings according to the invention are also considerably more abrasion-resistant than self-cleaning surfaces which comprise structure-forming particles with a considerably larger average diameter, for example >1 μm, bonded in a binder layer.

The structure-forming particles can be organic or inorganic substances. Among the inorganic substances there may be mentioned by way of example: metal oxides, mixed oxides, silicates, sulfates, phosphates, borates, metal sulfides, oxosulfides, selenides and sulfoselenides, metal nitrides and oxide-nitrides and metal powders. Among the organic structure-forming particles there may be mentioned by way of example carbon blacks and nanoscale organic polymeric particles, and among these fluorine-containing polymers. Structure-forming particles with the particle diameter according to the claims, such as, in particular, about 5 nm to less than 50 nm, are commercially obtainable. They can otherwise be obtained by precipitation processes which are known per se or by pyrogenic processes, wherein gaseous starting substances are converted into pulverulent substances. The structure-forming particles are particularly preferably naturally occurring, precipitated or pyrogenically prepared metal oxides from the series consisting of silica ($SiO_2$), titanium dioxide ($TiO_2$), aluminum oxide ($Al_2O_3$), zirconium dioxide ($ZrO_2$) and tin dioxide ($SnO_2$). These oxides are particularly preferably pyrogenically prepared oxides, and among these in particular silica. Pyrogenic silicas are commercially obtainable with an average primary particle size in the range from about 5 to 40 nm.

The top layer of self-cleaning lacquer layers according to the invention comprises, in addition to the structure-forming particles, a cured binder system, in particular an organic binder system. The structure-forming primary particles and agglomerates thereof are fixed in the binder system such that the surface structure is formed. The binder system can be a one- or multi-component system, and in addition a hydrophobizing agent contained in the top layer can be a constituent of the binder system. The latter is the case if both the binder system and the hydrophobizing agent contain reactive groups which react with one another during curing.

According to one embodiment of the lacquer coating according to the invention, the binder system of the base lacquer layer substantially corresponds to that of the top layer. As is shown, however, a reactive hydrophobizing agent can additionally have been incorporated into the latter. According to an alternative embodiment, the binder systems of the base lacquer layer and of the top layer—independently of a reactive hydrophobizing agent optionally incorporated—differ chemically. If the binder systems in the base lacquer layer and in the top layer are substantially the same, that part of the total coating in which the structure-forming particles according to the invention are present is regarded as the top layer.

The weight ratio of the binder system to the structure-forming particles bonded therein can be within wide limits; the ratio is determined decisively by the form of application of the composition for the production of the top layer. The weight ratio is conventionally in the range from 1:50 to 10:1, but preferably in the range from 1:5 to 5:1. It is essential that the structure-forming particles are present in a sufficient amount so that during application and curing of the top layer they do not sink into this completely, but form the nanoscale surface structure required according to the invention.

The structured top layer of the lacquer coating according to the invention can have a hydrophobizing layer applied after the structure formation, but the hydrophobizing agents are preferably distributed uniformly within the top layer and are present in a concentration such that a sufficient surface hydrophobization results. Those hydrophobizing agents which have entered into chemical bonding with constituents of the binder of the top layer and/or with reactive groups of the structure-forming particles are preferably present. In addition or alternatively, an initially monomeric or oligomeric hydrophobizing agent can also itself form a polymeric binder system during curing of the top layer and fix the structure-forming particles on the base lacquer layer.

Both the base lacquer layer and the top layer can contain chemically different binder systems. Substantially all known lacquer systems are possible for the base lacquer layer. These can be organic binders in an organic, organic-aqueous or purely aqueous solvent system. Radiation-curing lacquer systems and powder coating systems can also be employed. Examples of suitable binders are: cellulose-based binders, chlorinated rubber, polyvinyl compounds, acrylic and methacrylic resins, alkyd resins and other polyester resins, polymethane resins, epoxy resins, melamine, urea and phenolic resins and hydrocarbon resins.

According to a preferred embodiment, the base lacquer layer is based on a solvent-free or low-solvent binder system, for example one such as is used in powder coatings and radiation-curing lacquers. The binders for powder coatings are, in particular, epoxy-polyester systems, polyester-triglycidyl isocyanurate systems, other epoxy resin systems, polyester-polyurethane systems and, to a lesser extent, also thermoplastic resins, such as those based on polyethylene, polyamide, PVC, ethylene/vinyl alcohol copolymer and thermoplastic polyesters. Among the radiation-curing resin systems which are substantially based on a combination of a prepolymer, a monomer and a photoinitiator there may be mentioned by way of example acrylated epoxy resins, acrylated urethanes and polyester acrylates; the monomers are, in particular, polyfunctional acrylic compounds, such as acrylic esters of polyhydric alcohols.

The usable self-cleaning lacquer coating according to the invention comprises the binder or binders contained in the base lacquer layer and top layer in the cured state. The layer thickness of the top layer is conventionally considerably thinner than the layer thickness of the base lacquer layer. The layer thickness of the top layer is expediently in the range of 1 to 10 times the average particle diameter of the structure-forming particles.

The invention also provides compositions for the production of the top layer of a preferred self-cleaning lacquer coating—this preferred lacquer coating comprises a hydrophobizing agent in uniform distribution within the top layer. The composition as a rule has a liquid to viscous consistency and comprises as the main constituents a liquid medium, at least one hydrophobizing agent suspended or emulsified, but preferably dissolved therein, and structure-forming particles with an average particle diameter of less than 100 nm, in particular less than 50 nm to about 5 nm, optionally also to 1 nm, uniformly suspended therein. The hydrophobizing agent can itself be the liquid medium or can be a constituent thereof, but the hydrophobizing agent is preferably dissolved or emulsified/suspended in an organic or organic-aqueous solvent system or in water.

The structure-forming particles contained in the composition are those which have already been described above. They are preferably one or more metal oxides from the series consisting of $SiO_2$, $TiO_2$, $Al_2O_3$, $ZrO_2$ and $SnO_2$.

In a preferred embodiment, the composition comprises structure-forming particles and hydrophobizing agents in a weight ratio in the range from 1:5 to 5:1. The concentration and the weight ratio of these constituents in the composition according to the invention depend decisively on the desired effect and the suitability of the hydrophobizing agent for rendering possible good hydrophobization of the surface when distributed uniformly within the top layer. Preferred compositions comprise structure-forming particles, in particular oxides, in an amount of 0.1 to 5 wt. % and hydrophobizing agent in an amount of 0.1 to 5 wt. %.

The composition expediently comprises one or more organic solvents which are capable of dissolving the hydrophobizing agent or agents and the binder or binders which may be present or precursors thereof. Suitable solvents are, for example, monohydric alcohols having 1 to 4 C atoms and mono-, di- and trialkylene glycol monoalkyl ethers, wherein the alkylene group usually contains 2 or 3 C atoms and the alkyl group 1 to 4 C atoms.

If the composition according to the invention is binder-free, to obtain a scratch-resistant top layer which adheres firmly to the base lacquer layer the solvent system of the composition must be chosen such that this comprises a solvent which is capable of partly dissolving the binder system of the base lacquer layer so that the structure-forming particles are fixed in regions of the base lacquer layer close to the surface and can form the required structure. In this case, the choice of solvent depends both on the chemical nature of the binder system and on the extent to which the base lacquer system is partly or completely cured by evaporation of solvents and/or by gelling. Binder-free compositions which form the top layer are preferably applied to a base lacquer layer which has not yet dried, gelled or cured completely.

A preferred composition according to the invention for the production of the top layer additionally comprises one or more lacquer binders or precursors thereof, in addition to the structure-forming particles, the hydrophobizing agent and conventionally one or more solvents. The precursors are compounds which are polymerizable and/or polycondensable and/or accessible to a polyaddition. If the lacquer binder is present in the form of one or more precursors, the precursors are conventionally a combination of an oligomeric or polymeric compound and a second, optionally monomeric component which reacts with the oligomeric or polymeric compound during the curing operation and forms the cured binder.

Such combinations of precursors of a lacquer binder can be present, for example, in radiation-curing lacquer systems and in two-component powder coating systems. A composition comprising binder and/or precursors for the production of the top layer can comprise one or more of the resin systems mentioned in the description of the self-cleaning lacquer coating. The expert will use those binders which on the one hand ensure good fixing of the structure-forming particles, and on the other hand render possible a good adhesion to the base lacquer layer. The amount of lacquer binder or precursors employed in the composition which forms the top layer can vary within wide limits. The composition expediently comprises one or more lacquer binders or precursors thereof and structure-forming particles in a weight ratio in the range from 1:50 to 10:1, in particular 1:5 to 5:1.

The hydrophobizing agents contained in the compositions according to the invention can be known hydrophobizing agents, in particular fluorine-containing hydrophobizing agents. Preferred hydrophobizing agents are alkyl- and, in particular, fluoroalkylsilanes as well as oligomeric alkyl-, and in particular fluoroalkylsiloxanes, each of which contains one or more reactive groupings with which chemical bonds to the structure-forming particles and/or constituents of the binder system of the top layer can be formed. The silanes or siloxanes preferably contain one or more alkoxy groups, such as ethoxy groups, or acyloxy groups, such as acetoxy groups, as reactive groups. Such functional groups allow the formation of a chemical bond to, for example, silanol groups of structure-forming silica particles, and also a bond to functional groups of epoxy or polyester resins. At the same time, the hydrophobizing agent can undergo self-polycondensation via these reactive groups. Silanizing agents which are particularly preferably to be used are tridecafluorooctyltriethoxysilane and oligomers thereof. Such products are dissolved in the liquid medium of the composition according to the invention or are themselves a constituent thereof.

The invention also provides a process for the production of the self-cleaning lacquer coating according to the invention. The process comprises the following steps:

1. coating of a substrate with a coloured or non-coloured, pigmented or non-pigmented coating composition which forms a base lacquer layer by means of a known process appropriate for the coating composition;
2. application of a liquid to paste-like composition which forms a top layer to a cured, partly cured, gelled or non-cured base lacquer layer by means of a conventional coating process appropriate for the state of curing of the base lacquer layer, the composition having the constitution described above;
3. curing of the top layer and, if necessary, the base lacquer layer.

The conventional coating processes for the production of the base lacquer layer are, in the case where a pulverulent coating composition is used, a powder coating process, for example electrostatic coating, fluidized bed coating or dry application by means of a doctor blade or the like. If a liquid to paste-like lacquer is used to produce the base lacquer layer, coating processes such as brushing, dipping and spraying can be used. Since the composition which forms the top layer is in general a liquid to paste-like composition, spraying and dipping processes are particularly suitable for the coating if the base lacquer layer has not yet cured completely on application of the top layer. If the base lacquer layer has already cured, other known lacquering processes, such as brushing processes and known printing processes, can also be used.

Before application of the top layer, the base lacquer layer is expediently treated such that a largely closed layer has formed and, if solvents were contained in the coating material, a portion of the readily volatile constituents has evaporated. If a pulverulent coating composition is employed, a heat treatment accordingly follows the actual coating process, during which the powder particles flow together and the binder at least partly gels. If the composition which forms the top layer does not contain its own binder but fixing of the structure-forming particles takes place in the top region of the base lacquer layer, it is expedient to apply this composition before curing or in a state of curing/gelling of the binder system of the base lacquer layer such that sufficient partial dissolving of the binder of the base lacquer layer by a solvent contained in the composition is rendered possible, so that this binder also becomes the binder of the top layer.

According to a particularly preferred embodiment, a composition which forms the top layer and comprises the following main components is applied: 0.1 to 5 wt. % of structure-forming particles, in particular particles with an average particle diameter of less than 50 nm and at least about 5 nm; 0.1 to 5 wt. % of hydrophobizing agent, in particular from the series consisting of fluorine-containing alkoxysilanes and alkoxysiloxanes; 80 to 99.7 wt. % of liquid medium based on water and/or one or more organic solvents, in particular alcoholic solvents. If necessary, conventional processing auxiliaries, such as suspension auxiliaries and flow auxiliaries, in the conventional low concentration can additionally be present to a small extent.

The curing of the top layer and, if the base lacquer layer has not yet cured, also of the base lacquer layer is preferably carried out by a heat treatment. This is expediently carried out at not less than 100° C., in particular 150 to 280° C. During the curing, chemical reaction of reactive groups of the hydrophobizing agent with reactive groups of the binder and/or of the structure-forming particles also takes place.

The advantages of the invention lie in the fact that lacquer coatings which chemically are very different can be converted into a good self-cleaning lacquer coating. The coatings have a high scratch resistance and can therefore also be used in those fields of use in which mechanical stresses cannot be ruled out completely. The compositions according to the invention can be prepared in a simple manner and applied like any other liquid lacquer.

The following examples illustrate the invention.

EXAMPLES

An aluminum sheet (9×6 cm, 4 mm thick) was coated with a powder coating based on a polyester-epoxy resin by dry application by means of a slide. The dry layer thickness was 300 µm. The base lacquer layer was gelled or cured under the conditions (° C./duration) stated in the table (conditioning).

The constitution (data in g) of the composition which forms the top layer follows from the table. Pyrogenic silica (Aerosil® from Sivento) was employed as the structure-forming particles, and an alcoholic solution of tridecafluorooctyltriethoxysilane (Sylan® F8262 or F8263 from Sivento) was employed as the hydrophobizing agent. The constituents were made into a paste by means of a triple roll mill. The composition was applied as stated in the table. The amount applied was in each case about 0.25 g/sheet. Drying and curing were carried out for 20 minutes at 200° C.

The lacquer coatings proved to be scratch-resistant and had a good self-cleaning effect—roll-off angle less than 3°, in particular less than 1°.

TABLE

| | Example no. | | | | | | |
|---|---|---|---|---|---|---|---|
| | 1 | 2 | 3 | 4 | 5 | 6 | 7 |
| Conditioning | | | | | | | |
| ° C. | 140 | 140 | 140 | 140 | 140 | 140 | 140 |
| Min | 12 | 16 | 10 | 10 | 12 | 10 | 10 |
| Composition | | | | | | | |
| Aerosil 200[1)] | 0.25 | 2 | 2 | 1 | 1 | 1 | |
| Aerosil 380[2)] | | | | | | | 1 |
| Sylan F8262[3)] | 6 | | | | | | |
| Sylan F8263[4)] | | 48 | 48 | 40 | 40 | 45 | 45 |
| Ethanol | | | | 10 | 10 | | |
| PGMME[5)] | 0.4 | 3.2 | 3.2 | | | | |
| Medium[6)] | | | | 10 | 10 | 5 | 5 |
| Application | Screen printing | Brush | Spray gun | Spray gun | Spray gun | Spray gun | Spray gun |
| Roll-off angle | 3° | <3° | 2° | <2° | <2° | <1° | <1° |

[1)] and [2)]Primary particles d = 12 nm and 7 nm respectively
[3)] and [4)]1% solution of the silane in alcohols
[5)]PGMME: Propylene glycol monomethyl ether
[6)]Medium from dmc[2] Degussa Metals Catalysts Cerdec AG contains hydroxypropylcellulose (approx. 10%) as the binder in an alcoholic solvent mixture.

The invention claimed is:

1. A self-cleaning lacquer coating, comprising:
   a base lacquer layer; and
   a top layer comprising particles and a first binder system overlaying the base lacquer layer, wherein the binder system binds the particles such that the top layer has a structured surface of elevations and depressions formed by the particles, wherein the particles have an average particle diameter of less than 100 nanometers, wherein the average height of, and the average distance between, the elevations are less than 50 nanometers wherein the surface or top layer is at least partly hydrophobic, and wherein the weight ratio of binder system to particles is from about 1:50 to about 10:1.

2. The self-cleaning lacquer coating of claim 1, wherein the structure-forming particles have an average diameter of at least 5 nanometers to less than 50 nanometers.

3. The self-cleaning lacquer coating of claim 1, wherein the particles comprise a material selected from the group consisting of metal oxides, mixed oxides, silicates, sulfates, phosphates, borates, carbon blacks, metal powders, metal sulfides, selenides, sulfoselenides, oxosulfides, metal nitrides, oxidenitrides, organic polymers, and pigments, and combinations thereof.

4. The self-cleaning lacquer coating of claim 3, wherein the particles are metal oxides from the group consisting of $SiO_2$, $TiO_2$, $Al_2O_3$, $ZrO_2$ and $SnO_2$, and combinations thereof.

5. The self-cleaning lacquer coating of claim 1, wherein the base lacquer layer comprises a second binder system, wherein the second binder system is the same as the first.

6. The self-cleaning lacquer coating of claim 1, wherein
   the binder system comprises constituents and
   the particles comprise reactive groups, and
   an in-situ polymerized fluorine-containing hydrophobizing agent,
   wherein the hydrophobizing agent is bonded to at least one of the constituents and the reactive groups, thereby hydrophobizing at least a portion of the surface of the top layer.

7. The self-cleaning lacquer coating according to claim 1, wherein the binder system is formed from a resin selected from the group consisting of epoxy resins, polyester resins, polymethane resins, cellulose-based resins and vinyl resins.

8. A self-cleaning lacquer coating, comprising:
a base lacquer layer; and
a top layer comprising particles and a binder system overlaying the base lacquer layer, wherein the binder system binds the particles such that the top layer has a structured surface of elevations and depressions formed by the particles, wherein the particles have an average particle diameter of less than 100 nanometers, wherein the average height of, and the average distance between, the elevations are less than 50 nanometers and the surface or top layer is at least partly hydrophobic, and wherein the binder system and the particles are present in the top layer in a weight ratio of binder system to particles in the range of from about 1:5 to about 5:1.

9. A coating, comprising:
a first layer comprising a polymeric resin; and
a second layer overlaying the first layer and having an outer surface, wherein
the second layer comprises:
a binder;
a plurality of particles having an average diameter from about 7 nanometers to about 12 nanometers; and
a multifunctional halogenated silane or siloxane material;
wherein the weight ratio of binder to particles is from about 1:50 to about 10:1;
the outer surface having depressions and elevations that extend relative to the outer surface, the depressions and elevations being formed by the presence or absence in the outer surface of the plurality of particles, the average height of, and the average distance between, the elevations being less than 50 nanometers, and the multifunctional halogenated material being bound to the outer surface of the second layer through the multifunctional group and being oriented relative to the outer surface such that a halogen group on the silane or siloxane material can hydrophobize the outer surface, thereby reducing the roll-off angle relative to the outer surface to be less than about 3 degrees.

10. The coating according to claim 9, wherein:
the polymeric resin is selected from the group consisting of polyester-epoxy, polyester isocyanurate, polyester polyurethane, and epoxy;
the binder is selected from the group consisting of hydroxypropyl cellulose, chlorinated rubber, polyvinyl, acrylic, alkyd, melamine, phenolic, and polyester;
the plurality of particles comprise precipitated silica;
the multifunctional halogenated material is trifluorooctyltriethoxysilane or an oligomer thereof and
the roll-off angle relative to the outer surface is less than about 1 degree.

11. A process for producing a self-cleaning lacquer coating, comprising:
coating a substrate with a coating composition having a consistency of a liquid or of a paste so as to form a base lacquer layer;
determining a state of cure of the base lacquer as being cured, gelled, partly cured or non-cured;
selecting a coating process for coating the base lacquer layer with regard to the state of cure of the base lacquer layer;
coating the base lacquer layer with a liquid medium comprising:
a hydrophobizing agent being dissolved in the liquid medium, and structure-forming particles being suspended generally uniformly in the liquid medium, the particles having an average particle diameter of less than about 100 nanometers, and
a binder system operable to bind the particles to form a surface of a top layer wherein the surface is structured with elevations and depressions that extend relative to the top layer surface, and thereby to form the top layer overlaying at least a portion of the base lacquer layer;
wherein the average height of, and the average distance between, the elevations are less than 50 nanometers,
wherein the weight ratio of binder system to particles is from about 1:50 to about 10:1, and
wherein the surface or top layer is at least partly hydrophobic; and
curing the top layer, and if the base lacquer layer is gelled, partly cured or non-cured also curing the base lacquer layer.

12. The process of claim 11, further comprising at least partially evaporating solvents contained in the coating composition to effect at least partial gelling, at least partial drying, or at least partial curing of the base lacquer layer prior to applying the liquid medium to the base lacquer layer.

13. The process according to claim 11, further comprising heat treating the top layer at a temperature in a range of from about 100 degrees Celsius to about 250 degrees Celsius subsequent to the step of applying the liquid medium which forms the top layer to the base lacquer layer.

14. The process according to claim 13, wherein the heat treating temperature is in a range of from about 150 degrees Celsius to about 250 degrees Celsius.

15. A process for producing a self-cleaning lacquer coating, comprising:
coating a substrate with a coating composition having a consistency of a liquid or of a paste so as to form a base lacquer layer,
determining a state of cure of the base lacquer as being cured, gelled, partly cured or non-cured;
selecting a coating process for coating the base lacquer layer with regard to the state of cure of the base lacquer layer;
forming a top layer, by combining:
0.1 to 5 wt. % of structure-forming oxide particles having an average particle diameter of about 5 to about 50 nm;
0.1 to 10 wt. % of layer-forming binders or precursors;
0.1 to 5 wt. % of hydrophobizing agents selected from the group consisting of fluorine-containing alkoxysilanes and fluorine-containing alkoxysiloxanes; and
80 to 99.7 wt, % of a solvent selected from the group consisting of water, organic solvents, and combinations thereof;
coating the base lacquer layer with a liquid medium comprising:
a hydrophobizing agent being dissolved in the liquid medium, and structure-forming particles being suspended generally uniformly in the liquid medium, the particles having an average particle diameter of less than about 100 nanometers, and
a binder system operable to bind the particles such that a surface of the top layer is structured with elevations and depressions that extend relative to the top layer surface, wherein the top layer overlays at least a portion of the base lacquer layer; and curing the top layer, and if the base lacquer layer is gelled, partly cured or non-cured also curing the base lacquer layer.

16. A process for producing a self-cleaning lacquer coating, comprising:

coating a substrate with a coating composition having a consistency of a liquid or of a paste so as to form a base lacquer layer, determining a state of cure of the base lacquer as being cured, gelled, partly cured or non-cured;

selecting a coating process for coating the base lacquer layer with regard to the state of cure of the base lacquer layer;

coating the base lacquer layer with a liquid medium to form a top layer, the top layer comprising particles and a binder system, the liquid medium comprising a solvent, a hydrophobizing agent, and structure-forming particles, wherein the weight ratio of binder system to particles is from about 1:50 to about 10:1; the hydrophobizing agent and the particles being dissolved or suspended in the solvent, the particles having an average particle diameter of less than about 100 nanometers, the solvent being operable to dissolve at least a surface portion of the base lacquer layer and cause at least a portion of the dissolved binder to migrate from the base lacquer layer into the top layer so that the top layer comprises a predetermined amount of migrated binder sufficient to bind the particles upon curing; and curing the base lacquer layer and the top layer such that a surface of the top layer is structured with elevations and depressions that extend outward relative to the surface of the top layer, said elevations and depressions being formed by the particles, the average height of, and the average distance between the elevations being less than 50 nanometers, and the surface of the top layer being at least partially hydrophobic.

* * * * *